April 15, 1941.  C. H. FLURSCHEIM ET AL  2,238,636

ELECTRIC SWITCHGEAR

Filed Sept. 9, 1938

Inventors:
Cedric H. Flurscheim,
Wilfred F. Skeats,
by Harry E. Dunham
Their Attorney.

Patented Apr. 15, 1941

2,238,636

UNITED STATES PATENT OFFICE 2,238,636

ELECTRIC SWITCHGEAR

Cedric Harold Flurscheim, Fleet, England, and Wilfred F. Skeats, Lansdowne, Pa., assignors to General Electric Company, a corporation of New York Application September 9, 1938, Serial No. 229,108

8 Claims. (Cl. 200—48)

Our invention relates to electric switchgear, more particularly to polyphase switchgear of the high voltage type for controlling and isolating electric power circuits, and has specific application to switchgear apparatus that can be disconnected by bodily movement thereof from the main circuit terminals.

A principal object of our invention is the provision of improved switchgear of the aforesaid type including switchgear apparatus, such as a circuit breaker so arranged that it can be bodily moved between circuit controlling, isolating and readily accessible inspection positions by comparatively simple, compact and efficient operating mechanism.

The disconnection and isolation of high voltage switchgear has been accomplished in a number of ways, one being in the case of the well-known draw-out type by bodily movement of the circuit breaker by means of a truck or jack screw elevating mechanism between disconnected or isolated and connected positions. Also, in certain types of high voltage metal clad switchgear for indoor installations an overhead crane has been used for bodily lifting the circuit breaker and moving the same to various circuit controlling and isolating positions. A serious disadvantage of many of these methods is that considerable floor space or complicated and expensive operating mechanism, or both, are involved.

In accordance with the present invention the movable part of the switchgear such as the circuit breaker, for example, is pivotally mounted with respect to a horizontal axis and is substantially balanced with respect thereto so that a comparatively simple and low power operating mechanism is effective to move the breaker between the various circuit controlling, isolation and inspection positions.

Our invention will be more fully set forth in the following description referring to the accompanying drawing, and the features of novelty which characterize our invention will be pointed out with particularity in the claims annexed to and forming a part of this specification.

Figure 1:
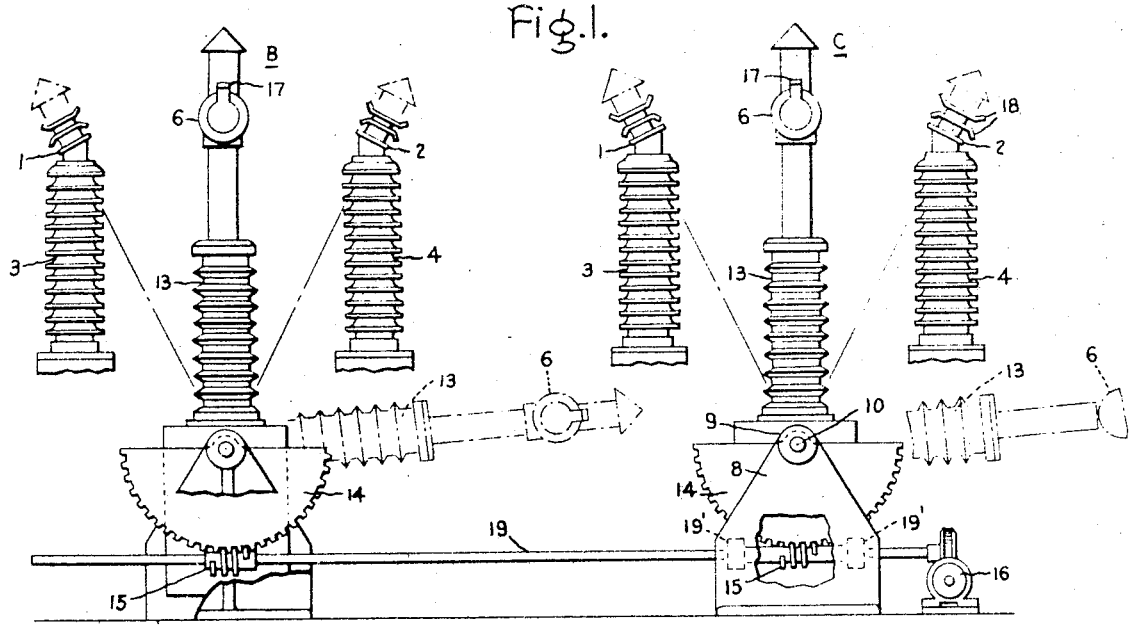
Figure 2:
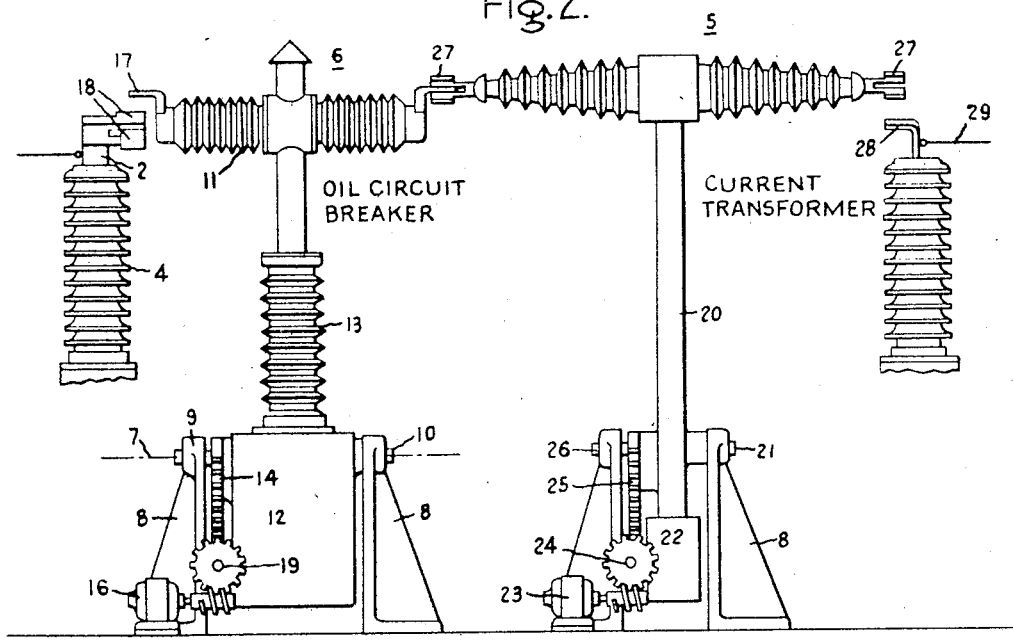
Figure 3:
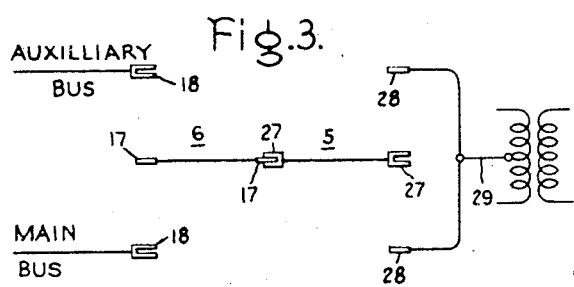

Referring to the drawing, Fig. 1 is an elevational view, partly broken away, of two phases of a double bus switchgear arrangement embodying the present invention; Fig. 2 is an elevational side view of apparatus shown by Fig. 1; and Fig. 3 is a diagrammatic illustration of the circuit connections of the double bus arrangement shown by Figs. 1 and 2.

The polyphase switchgear shown by Fig. 1 comprises the conventional three phases, two of which, indicated at B and C, are illustrated. It shall be understood that a specific illustration of the third phase is unnecessary for a complete understanding of the present invention, since similar structures are involved.

Referring more particularly to the drawing, each phase arrangement includes double or alternative busses, such as a main bus 1 and an auxiliary bus 2. The bus terminal connections are suitably supported by stationary insulating pillars 3 and 4 respectively and are preferably horizontally spaced a suitable distance well above the ground or floor level. The movable elements of the switchgear comprising in the present instance, a current transformer 5 and an oil circuit breaker 6 (Fig. 2) are mounted for pivotal movement between the main and auxiliary busses.

The oil circuit breaker which in the high voltage arrangement shown by way of example may be of the type disclosed in Prince Patent No. 1,922,862, granted August 15, 1933, for Electric switching apparatus, is provided with a pivotal mounting for rotation about a horizontal axis 7. As shown, the mounting is of trunnion form and comprises a pair of supporting members 8 having bearings at 9 for the trunnion or shaft 10. The complete circuit breaker mechanism includes a horizontally disposed interrupting unit 11 and an operating mechanism 12, which is operatively connected to the relatively movable contact structure (not shown) by means extending through a vertical insulating support 13. The circuit breaker proper is symmetrically mounted with respect to the axis 7 so that the operating mechanism 12 serves substantially as a counterbalance for the interrupting unit 11. It will therefore be apparent that a comparatively small amount of power is required for rotating the circuit breaker unit with respect to the axis 7.

For the purpose of rotating the circuit breaker interrupting unit 11 to various circuit controlling and isolating positions, a gear segment 14 is secured to the shaft 10 for coaction with a worm gear 15 driven by a small motor 16. In the position shown in Fig. 1 the circuit breaker of each phase is in an isolated disconnected position midway between the terminal connections of the main and auxiliary busses. In this position both busses are dead and the breaker is also disconnected from any source of potential.

Connection of the break to either bus is effected by energizing the motor 16 in the proper direction so as to cause rotation of the gear segment 14 and corresponding movement of the breaker into connection with the selected bus. It should be understood of course that the usual interlocking of disconnecting and circuit breaker operations would be employed in practice. Since interlocking devices form no part of the present invention and a detail description thereof is not required for a clear and complete understanding thereof, illustration is omitted.

The disconnect contacts themselves at the circuit breaker and bus terminals may be of any suitable form, the present construction comprising simply a blade-like contact 17 connected to each circuit breaker terminal and a pair of coacting finger contacts 18 connected to each bus terminal. The finger contacts are resiliently biased towards each other so as to clasp the blade contact in the connected position, the arrangement being such that the blade contact can enter and pass through the finger contact from either direction.

Accordingly, when the circuit breaker interrupting unit is to be inspected or repaired, the breaker can be rotated throughout approximately 90 degrees to one of the lower dotted line positions shown in Fig. 1. In this position the breaker not only is completely isolated, but is near the floor level so that a maintenance crew can have ready access to the breaker structure. The operating motor 16 by means of a common gear-drive shaft 19 having bearings at 19' is also effective to operate simultaneously the corresponding breakers of all three phases, as illustrated by Fig. 1.

There is also shown in Fig. 2 a current transformer mounted for similar movement. In this case the supporting pillar 20 of the current transformer 5 is pivotally mounted at 21 in a manner similar to the circuit breaker and is provided with a counterweight 22. The operating means is also substantially similar to that of the circuit breaker, a motor 23 operating through a suitable gear shaft 24 and gear segment 25, the supporting trunnion or shaft 26. The current transformer at its terminals is also provided with finger type contacts 27 for coacting in the manner above described with blade contacts 17 and 28 carried at corresponding terminals of the oil circuit breaker and the incoming line 29.

The disconnecting arrangement for a double bus is diagrammatically illustrated by Fig. 3, the oil circuit breaker and current transformer being movable either individually or together from the isolating position shown to the main bus or auxiliary bus-connecting positions or to the isolated positions adjacent the floor level.

It will be apparent that in some installations special disconnection and inspection of the current transformer may be considered unnecessary and, in such cases, the current transformer can be permanently connected in the incoming transformer circuit 29, so that the oil circuit breaker is the only movable element of the switchgear.

An advantage of this type of switchgear is that it is particularly applicable to very high voltages requiring comparatively large isolating distances and electrical clearances. In the bus-connecting and normal isolating positions, the breaker and the potential bearing parts can be located without difficulty 15 or 20 feet above the floor level whereas an inspection position for the same switchgear but 2 or 3 feet above the floor level is possible. As above pointed out, this can be accomplished by the use of a comparatively low power operating mechanism in combination with a comparatively simple and efficient trunnion structure whereby the movable element of the switchgear can be rotated through an arc of approximately 180 degrees.

It should be understood that our invention is not limited to specific details of construction and arrangement thereof herein illustrated, and that changes and modifications may occur to one skilled in the art without departing from the spirit of our invention.

What we claim as new and desire to secure by Letters Patent of the United States is:

1. Electric switchgear of the high voltage type comprising a movable circuit breaker, stationary circuit terminals cooperating therewith, a pivotal support for said circuit breaker extending along a horizontal axis and positioned adjacent to an operating floor, said circuit breaker being disposed an appreciable distance above said axis in the connected position thereof, means for counterbalancing said breaker with respect to said axis so that said breaker can be serviced at floor level in one position thereof, and coacting disconnect contacts connected respectively to terminals of said circuit breaker and said stationary circuit terminals adapted to be engaged and disengaged by pivotal movement of said breaker.

2. Electric switchgear operable between connected and isolated positions comprising a movable circuit breaker, the longitudinal axis of which is substantially horizontally disposed, stationary circuit conductors controlled by said breaker, means including trunnion structure positioned adjacent to an operating floor for pivotally mounting said breaker for movement about an axis appreciably beneath said longitudinal axis in the connected position of said breaker, and disconnect contacts disposed at the opposite ends of said horizontally disposed circuit breaker for coacting with corresponding disconnect contacts adapted to be connected to said stationary circuit conductors when said breaker is rotated about said pivotal mounting, rotation of said breaker to the inspection position thereof positioning it adjacent to floor level.

3. Electric switchgear of the high voltage type comprising a pair of horizontally spaced bus circuit terminals, said terminals being positioned an appreciable distance above the floor level, an electric circuit breaker bodily movable between said terminals, means for pivotally supporting said circuit breaker for rotative movement about a horizontal axis, disconnect contacts connected respectively to terminals of said circuit breaker and to said bus circuit terminals adapted to be engaged and disengaged in accordance with rotative movement of said circuit breaker about said horizontal axis, and means for rotating said circuit breaker to connected and isolated positions with respect to either of said bus terminals, and to an inspection position at a point adjacent said floor level.

4. Electric polyphase switchgear comprising a plurality of individual circuit breakers, means for pivotally supporting each of said circuit breakers for rotative movement about a horizontal axis, stationary circuits controlled by said circuit breakers, disconnect contacts connected respectively to terminals of said circuit breakers and said stationary circuits, each circuit breaker movable through an arc to isolated and connected positions with respect to the corresponding stationary circuit, and a single operating means for rotating said circuit breakers to the aforesaid positions including a main drive shaft and gear structure for connecting said shaft to each of said breakers at the pivotal mounting thereof.

5. Electric switchgear of the high voltage type comprising an oil circuit breaker mounted for bodily movement with respect to a stationary circuit controlled thereby, coacting disconnect contacts connected respectively to a terminal of said stationary circuit and the corresponding terminal of said circuit breaker, a current transformer arranged to be connected in series with said circuit breaker likewise mounted for bodily movement with respect to a second stationary circuit terminal, coacting disconnect contacts connected respectively to said second terminal and the corresponding terminal of said current transformer, coacting disconnect contacts also connected to the adjacent terminals of said oil circuit breaker and current transformer respectively, and means for effecting movement of said circuit breaker and current transformer either individually or simultaneously to connected or isolated positions or to a position completing the circuit between said first and second stationary circuits.

6. Electric switchgear of the high voltage type comprising a pair of horizontally spaced bus circuit terminals, said terminals being positioned an appreciable distance above the floor level, an electric circuit breaker bodily movable for selective connection with said terminals, means for pivotally supporting said circuit breaker for rotation about an axis offset with respect to said circuit breaker, and disconnect contacts connected respectively to terminals of said circuit breaker and said bus circuit adapted to be engaged and disengaged in accordance with rotation of said circuit breaker about said axis, and means for rotating said circuit breaker to selective engagement with either of said bus terminals, to an isolated position intermediate said bus terminals, and also to an inspection position at a point adjacent said floor level at either side of said axis.

7. Electric switchgear comprising a stationary circuit terminal, a switchgear element bodily movable with respect thereto to connected and disconnected positions, coacting disconnect contacts connected respectively to said bus terminal and a terminal of said element adapted to be engaged and disengaged by relative movement of said element, means for pivotally supporting said element disposed adjacent to an operating floor for rotation about a horizontal axis appreciably beneath said element in the connected position thereof, and means for counterbalancing said element whereby the same can be rotated through a wide arc to said connected and disconnected positions by low power operating means, said arc also defining an inspection position adjacent to floor level.

8. Electric switchgear of the high voltage type comprising a fixed circuit terminal disposed an appreciable distance above an operating floor, an electric circuit breaker bodily movable to connected and isolated positions with respect to said fixed terminal, and means for pivotally supporting said circuit breaker disposed adjacent to said floor for rotative movement about an axis beneath said circuit breaker in the connected position thereof, said circuit breaker being movable through an arc of at least 90 degrees for providing an inspection position at the lower part of said arc, and a circuit connecting position at one or more points at the upper part of said arc.

CEDRIC HAROLD FLURSCHEIM.
WILFRED F. SKEATS.